United States Patent
Yamamoto et al.

(10) Patent No.: US 10,908,336 B2
(45) Date of Patent: Feb. 2, 2021

(54) OPTICAL LAMINATE, IMAGE DISPLAY DEVICE, OR TOUCH PANEL SENSOR

(71) Applicant: Dai Nippon Printing Co., Ltd., Tokyo (JP)

(72) Inventors: Kana Yamamoto, Tokyo (JP); Takanori Hamada, Tokyo (JP); Masataka Nakashima, Tokyo (JP); Takahisa Nomura, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 180 days.

(21) Appl. No.: 16/082,194

(22) PCT Filed: Mar. 6, 2017

(86) PCT No.: PCT/JP2017/008728
§ 371 (c)(1),
(2) Date: Nov. 27, 2018

(87) PCT Pub. No.: WO2017/150739
PCT Pub. Date: Sep. 8, 2017

(65) Prior Publication Data
US 2019/0381762 A1    Dec. 19, 2019

(30) Foreign Application Priority Data

Mar. 4, 2016 (JP) ................................. 2016-042848
Dec. 21, 2016 (JP) ................................. 2016-248262

(51) Int. Cl.
*G02B 5/28* (2006.01)
*B32B 27/08* (2006.01)
(Continued)

(52) U.S. Cl.
CPC .............. *G02B 5/283* (2013.01); *B32B 27/08* (2013.01); *C08L 33/14* (2013.01); *G02B 5/208* (2013.01);
(Continued)

(58) Field of Classification Search
CPC ........ G02B 5/208; G02B 5/283; G02B 1/041; G02B 1/04; B32B 7/025; B32B 7/023;
(Continued)

(56) References Cited

U.S. PATENT DOCUMENTS

2006/0252850 A1    11/2006  Jani et al.
2009/0142562 A1     6/2009  Miyagawa et al.
(Continued)

FOREIGN PATENT DOCUMENTS

EP    0 282 294    9/1988
EP    2 963 457    1/2016
(Continued)

OTHER PUBLICATIONS

JP2015/194799 Hayashida et al., google patents machine translation obtained May 20, 2020 (Year: 2015).*

*Primary Examiner* — Kristina M Deherrera
(74) *Attorney, Agent, or Firm* — Hamre, Schumann, Mueller & Larson, P.C.

(57) ABSTRACT

The present invention provides an optical layered body having excellent blue light blocking properties without affecting the color tone of displayed images. Provided is an optical layered body having a structure including: a substrate; and one or two or more functional layers on at least one surface of the substrate, the optical layered body having a spectral transmittance at a wavelength of 380 nm of lower than 1%, a spectral transmittance at a wavelength of 410 nm of lower than 10%, and a spectral transmittance at a wavelength of 440 nm of 70% or higher.

9 Claims, 2 Drawing Sheets

(51) Int. Cl.
  *C08L 33/14* (2006.01)
  *G02B 5/20* (2006.01)
  *B32B 7/023* (2019.01)
  *B32B 3/30* (2006.01)
  *G02B 5/22* (2006.01)
  *G02F 1/1335* (2006.01)
  *G06F 3/041* (2006.01)

(52) U.S. Cl.
  CPC .............. *B32B 3/30* (2013.01); *B32B 7/023* (2019.01); *B32B 2457/208* (2013.01); *C08L 2203/20* (2013.01); *G02B 5/22* (2013.01); *G02F 1/133502* (2013.01); *G02F 2201/086* (2013.01); *G02F 2203/05* (2013.01); *G06F 3/041* (2013.01)

(58) Field of Classification Search
  CPC .......... B32B 3/30; G02C 7/108; G02C 7/022; G02C 2202/16
  USPC ........................................................ 359/359
  See application file for complete search history.

(56) References Cited

U.S. PATENT DOCUMENTS

| | | |
|---|---|---|
| 2015/0055033 A1 | 2/2015 | Imamura et al. |
| 2015/0055108 A1* | 2/2015 | Huber .................. G02B 5/0891 355/67 |
| 2015/0370094 A1 | 12/2015 | Hashimoto et al. |
| 2016/0215121 A1 | 7/2016 | Kousaka et al. |

FOREIGN PATENT DOCUMENTS

| | | |
|---|---|---|
| JP | 8-287715 | 11/1996 |
| JP | 2000-034464 | 2/2000 |
| JP | 2002-082218 | 3/2002 |
| JP | 2006-264312 | 10/2006 |
| JP | 2007-093927 | 4/2007 |
| JP | 2007-152591 | 6/2007 |
| JP | 2008-181097 | 8/2008 |
| JP | 2012-025680 | 2/2012 |
| JP | 2012041333 | 3/2012 |
| JP | 2013054275 | 3/2013 |
| JP | 2013-114184 | 6/2013 |
| JP | 2014-151540 | 8/2014 |
| JP | 2014-164111 | 9/2014 |
| JP | 2014-202864 | 10/2014 |
| JP | 2015-153320 | 8/2015 |
| JP | 2015-194555 | 11/2015 |
| JP | 2015-194799 | 11/2015 |
| WO | 2014/133111 | 9/2014 |
| WO | 2015/046540 | 4/2015 |

* cited by examiner

OPTICAL LAMINATE, IMAGE DISPLAY DEVICE, OR TOUCH PANEL SENSOR

TECHNICAL FIELD

The present invention relates to an optical layered body, and an image display device or a touch panel sensor.

BACKGROUND ART

Recently, light emitting diodes (LEDs) are aggressively used as backlight light sources of image display devices such as PCs or tablet PCs and touch panels. LEDs emit intense light called blue light.

The blue light is light at a wavelength of 380 to 495 nm having similar characteristics to UV rays. The blue light is considered to cause damage to the retina, eyestrain, negative influences on sleep because it reaches the retina without being absorbed by the cornea or crystal lens because of its strong energy.

The blue light is therefore desired to be blocked in image display devices to the extent that the color tone of displayed images is not affected.

As a means for solving such a problem, Patent Literature 1 proposes optical articles such as sunglasses or antiglare glasses for protecting eyes from blue light.

In the case of image display devices such as PCs and tablet PCs or touch panels, however, blue light may cause yellowing of component members (e.g., film, substrate) or deterioration of members due to its similar characteristics to UV light. Such a problem cannot be solved by the optical articles mentioned above.

As a method of solving the blue light problem, a substrate or an optical functional layer constituting a film included in an image display device may contain an UV absorber to exhibit light resistance.

As such an UV absorber, Patent Literatures 2 and 3 and the like disclose UV absorbers such as benzotriazole copolymers.

However, a conventional UV absorber added to a substrate or the like constituting a film included in an image display device has an absorption wavelength range in a short wavelength range centered at around 300 to 360 nm, failing to exhibit sufficient performance of absorbing light to the extent that the color tone of displayed images is not affected.

CITATION LIST

Patent Literature

Patent Literature 1: JP 2007-093927 A
Patent Literature 2: JP 2000-034464 A
Patent Literature 3: JP 2006-264312 A

SUMMARY OF INVENTION

Technical Problem

The present invention aims to provide, in consideration of the state of the art, an optical layered body having excellent blue light blocking properties without affecting the color tone of displayed images, and an image display device or touch panel sensor produced using the optical layered body.

Solution to Problem

The present invention relates to an optical layered body having a structure including: a substrate; and one or two or more functional layers on at least one surface of the substrate, the optical layered body having a spectral transmittance at a wavelength of 380 nm of lower than 1%, a spectral transmittance at a wavelength of 410 nm of lower than 10%, and a spectral transmittance at a wavelength of 440 nm of 70% or higher.

In the optical layered body of the present invention, a transmission spectrum within a wavelength range of 415 to 435 nm obtained by a least square method preferably has a tilt a satisfying a >2.0.

In the optical layered body of the present invention, at least one of the functional layers preferably has a spectral transmittance at 380 nm of lower than 1%, a spectral transmittance at a wavelength of 410 nm of lower than 10%, and a spectral transmittance at a wavelength of 440 nm of 70% or higher.

The optical layered body of the present invention preferably has an arithmetic average roughness Ra of less than 10 nm on a surface opposite to a substrate side surface of the functional layer.

The optical layered body of the present invention preferably has projections and depressions on a surface opposite to a substrate side surface of the functional layer.

The optical layered body of the present invention preferably further includes multiple deposition layers on a surface opposite to a substrate side surface of the functional layer.

The optical layered body of the present invention preferably further includes an invisiblizing layer having a layered structure including multiple layers different in refractive index.

The present invention also relates to an image display device or touch panel sensor produced using the optical layered body of the present invention.

The present invention is specifically described in the following.

The present inventors intensively studied about the blue light problem in an optical layered body having a structure including a substrate and a functional layer, and found out that sufficient absorption of light within a wavelength range of 410 nm or shorter and sufficient transmission of light within a wavelength range of 440 nm or longer, of light within the blue light wavelength range, can solve the blue light problem without affecting the color tone of displayed images. Thus, the present invention was completed.

The optical layered body of the present invention has a structure including a substrate and one or two or more functional layers formed on at least one surface of the substrate.

The optical layered body of the present invention having such a structure has a spectral transmittance at a wavelength of 380 nm of lower than 1%, a spectral transmittance at a wavelength of 410 nm of lower than 10%, and a spectral transmittance at a wavelength of 440 nm of 70% or higher.

Having such optical characteristics, the optical layered body of the present invention does not affect the color tone of displayed images and is excellent in blue light blocking properties when used in an image display device or a touch panel sensor.

The optical layered body of the present invention satisfying the spectral transmittance mentioned above blocks most of light at a wavelength of 410 nm or shorter and almost entirely blocks light at a wavelength of 380 nm or shorter to favorably prevent a problem caused by blue light, while transmitting most of light at a wavelength of 440 nm or longer to avoid an influence on the color tone of displayed images. It indicates that the transmittance of light of the optical layered body of the present invention is almost 0% at a wavelength shorter than 380 nm, gradually increases at a wavelength of 410 nm or longer, and increases sharply at a wavelength of around 440 nm. Specifically, as illustrated in FIG. 1, the spectral transmittance within a wavelength range from 410 nm to 440 nm of the optical layered body of the present invention varies to draw a sigmoid curve.

The spectral transmittance of the optical layered body of the present invention at a wavelength of 380 nm is preferably lower than 0.5%, more preferably lower than 0.2%. The spectral transmittance at a wavelength of 410 nm is preferably lower than 7%, more preferably lower than 5%. The spectral transmittance at a wavelength of 440 nm is preferably 75% or higher, more preferably 80% or higher.

The optical layered body of the present invention preferably has a spectral transmittance at a wavelength of 420 nm of lower than 50%. The optical layered body of the present invention satisfying such a spectral transmittance relation has a transmittance sharply increasing at a wavelength of around 440 nm, obtaining very excellent blue light blocking properties without affecting the color tone of displayed images.

FIG. 1 is a graph showing an example of the spectral transmittance of the optical layered body of the present invention.

When the spectral transmittance at a wavelength of 380 nm is 1% or higher or when the spectral transmittance at a wavelength of 410 nm is 10% or higher, the problem caused by blue light cannot be solved. When the spectral transmittance at a wavelength of 440 nm is lower than 70%, the color tone of displayed images on an image display device or touch panel sensor produced using the optical layered body of the present invention is affected. How to achieve the spectral transmittance mentioned above is described later.

When the measurement of the spectral transmittance is performed on the optical layered body of the present invention formed on a polarizer, the spectral transmittance at a wavelength of 440 nm may be lower than 70%. Therefore, whether or not the requirement of the spectral transmittance is satisfied is determined by calculating the spectral transmittance of the optical layered body of the present invention alone with the polarizer removed therefrom. The calculation of the spectral transmittance of the optical layered body of the present invention alone with the polarizer removed therefrom can be performed by, for example, simulation.

The transmission spectrum within a wavelength range of 415 to 435 nm obtained by a least square method of the optical layered body of the present invention preferably has a tilt a satisfying a >2.0. When the tilt a is 2.0 or less, light may not be cut off sufficiently within a blue light wavelength range, e.g., within a wavelength range of 415 to 435 nm, resulting in a poor blue light cutting effect. There may be a case where light within a blue light wavelength range (wavelength of 415 to 435 nm) is too much cut off. In such a case, light emitted from a backlight in an image display device or light of an emission wavelength range (for example, OLED's emission of light at a wavelength from 430 nm) may be interfered, increasing the possibility of a trouble such as poor color tone. The tilt a more preferably satisfies a >1.9.

The tilt a can be calculated by measuring the transmittance in 1 nm ranges before and after a certain wavelength within a range of 415 to 435 nm using a spectrophotometer (UVPC-2450 available from Shimadzu Corporation) with which the transmittance can be measured in units of 0.5%.

The optical layered body of the present invention preferably has a blue light blocking rate of 40% or higher. With the blue light blocking rate of lower than 40%, the problem caused by blue light described above may not be sufficiently solved.

The blue light blocking rate is a value calculated in conformity with, for example, JIS T 7333-2005.

Such a blue light blocking rate can be achieved by, for example, incorporation of a sesamol-type benzotriazole monomer described later in the optical layered body of the present invention.

The optical layered body of the present invention can favorably satisfies the spectral transmittance described above when containing a sesamol-type benzotriazole monomer represented by the following formula (1).

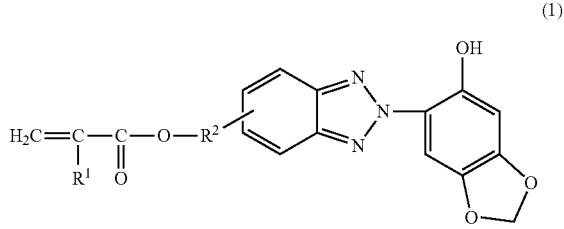

(1)

In the formula, $R^1$ represents a hydrogen atom or a methyl group. $R^2$ represents a C1-C6 linear or branched alkylene group or a C1-C6 linear or branched oxyalkylene group.

The sesamol-type benzotriazole monomer is not particularly limited, and specific examples thereof include 2-[2-(6-hydroxybenzo[1,3]dioxol-5-yl)-2H-benzotriazol-5-yl]ethyl methacrylate, 2-[2-(6-hydroxybenzo[1,3]dioxol-5-yl)-2H-benzotriazol-5-yl]ethyl acrylate, 3-[2-(6-hydroxybenzo[1,3]dioxol-5-yl)-2H-benzotriazol-5-yl]propyl methacrylate, 3-[2-(6-hydroxybenzo[1,3]dioxol-5-yl)-2H-benzotriazol-5-yl]propyl acrylate, 4-[2-(6-hydroxybenzo[1,3]dioxol-5-yl)-2H-benzotriazol-5-yl]butyl methacrylate, 4-[2-(6-hydroxybenzo[1,3]dioxol-5-yl)-2H-benzotriazol-5-yl]butyl acrylate, 2-[2-(6-hydroxybenzo[1,3]dioxol-5-yl)-2H-benzotriazol-5-yloxy]ethyl methacrylate, 2-[2-(6-hydroxybenzo[1,3]dioxol-5-yl)-2H-benzotriazol-5-yloxy]ethyl acrylate, 2-[3-{2-(6-hydroxybenzo[1,3]dioxol-5-yl)-2H-benzotriazol-5-yl}propanoyloxy]ethyl methacrylate, 2-[3-{2-(6-hydroxybenzo[1,3]dioxol-5-yl)-2H-benzotriazol-5-yl}propanoyloxy]ethyl acrylate, 4-[3-{2-(6-hydroxybenzo[1,3]dioxol-5-yl)-2H-benzotriazol-5-yl}propanoyloxy]butyl methacrylate, 4-[3-{2-(6-hydroxybenzo[1,3]dioxol-5-yl)-2H-benzotriazol-5-yl}propanoyloxy]butyl acrylate, 2-[3-{2-(6-hydroxybenzo[1,3]dioxol-5-yl)-2H-benzotriazol-5-yl}propanoyloxy]ethyl methacrylate, 2-[3-{2-(6-hydroxybenzo[1,3]dioxol-5-yl)-2H-benzotriazol-5-yl}propanoyloxy]ethyl acrylate, 2-(methacryloyloxy)ethyl-2-(6-hydroxybenzo[1,3]dioxol-5-yl)-2H-benzotriazol-5-carboxylate, 2-(acryloyloxy)ethyl-2-(6-hydroxybenzo[1,3]dioxol-5-yl)-2H-benzotriazol-5-carboxylate, 4-(methacryloyloxy)butyl-2-(6-hydroxybenzo[1,3]dioxol-5-yl)-2H-benzotriazol-5-carboxylate, and 4-(acryloyloxy)butyl-2-(6-hydroxybenzo[1,3]dioxol-5-yl)-2H-benzotriazol-5-carboxylate.

These sesamol-type benzotriazole monomers may be used alone or in combination of two or more thereof.

The sesamol-type benzotriazole monomer may be contained in the optical layered body of the present invention in any form as long as it satisfies the requirement of the spectral transmittance described above.

Specifically, for example, the optical layered body of the present invention may contain the sesamol-type benzotriazole monomer in one layer (for example, a functional layer described later) to satisfy the requirement of the spectral transmittance with the one layer. Alternatively, the function of satisfying the requirement of the spectral transmittance may be shared by multiple layers.

In other words, at least one of the functional layers in the optical layered body of the present invention preferably has a spectral transmittance at a wavelength of 380 nm of lower than 1%, a spectral transmittance at a wavelength of 410 nm of lower than 10%, and a spectral transmittance at a wavelength of 440 nm of 70% or higher.

An exemplary structure in which multiple layers share the function of satisfying the requirement of the spectral transmittance is a structure in which the functional layers include two layers (a functional layer A and a functional layer B), the functional layer A contains the sesamol-type benzotriazole monomer such that only the spectral transmittance at a wavelength of 380 nm is achieved, and the functional layer B contains the sesamol-type benzotriazole monomer such that the spectral transmittance at a wavelength of 410 nm and the spectral transmittance at a wavelength of 440 nm are achieved. Moreover, the functional layers may include three or more layers, and those functional layers may contain the sesamol-type benzotriazole monomer so as to satisfy, as a whole, the requirement of the spectral transmittance described above.

The functional layers containing the sesamol-type benzotriazole monomer may be present at any position in the optical layered body of the present invention.

Moreover, the optical layered body of the present invention may have two or more structures including a functional layer on one surface of a substrate. Specifically, the optical layered body of the present invention may have a structure A including a functional layer A on one surface of a substrate A and a structure B including a functional layer B on one surface of a substrate B. In this case, the sesamol-type benzotriazole monomer may be contained in any of these structures as long as the structures as a whole satisfy the requirement of the spectral transmittance described above.

In the case where the optical layered body of the present invention is used in an organic electroluminescence (organic EL) display device as an image display device, for example, a preferred structure includes a functional layer A provided between an OLED and a substrate and a functional layer B provided on the surface opposite to the OLED side surface of the substrate.

Such a structure allows multiple layers to share the function of satisfying requirement of the spectral transmittance, and therefore, the amount of the sesamol-type benzotriazole monomer in each functional layer can be reduced, thereby improving the optical characteristics and mechanical characteristics.

Even in the case where polyethylene terephthalate or a polyimide resin is used for the substrate, a problem of weather resistance caused by external light or blue light derived from LED (e.g., degradation or yellowing of components) can be favorably solved.

Examples of the raw material of the substrate in the case where the optical layered body of the present invention have the above-mentioned structure include glass, TAC, PET, PEN, PI, and acrylic resins.

Another preferred structure includes a functional layer A between an OLED and a substrate, an invisiblizing layer on the OLED side surface of the substrate, a functional layer B on the surface opposite to the OLED side surface of the substrate, and an invisiblizing layer on the surface opposite to the OLED side surface of the functional layer B. In this case, examples of the raw material of the substrate include PEN. The structure more preferably includes a layer satisfying the requirement of the spectral transmittance on the surface of the substrate on the side closest to the viewer (viewer side).

In the case of a structure in which three layers share the function of satisfying the spectral transmittance (shared by functional layers A to C), the structure preferably includes a functional layer A and a functional layer B between an OLED and a substrate film in the stated order from the OLED side, an invisiblizing layer on the substrate side surface of the functional layer B, a functional layer C on the surface opposite to the OLED side surface of the substrate, and an invisiblizing layer on the surface opposite to the OLED side surface of the functional layer C.

With such a structure, the problem of weather resistance of the substrate mentioned above can be favorably solved. In addition, since the functional layer can be thinned, cracking of the functional layers upon formation of an invisiblizing layer can be prevented.

Another exemplary structure preferably includes a functional layer A and a functional layer B between an OLED and an outermost substrate with the functional layer B provided on the surface opposite to the viewer side surface of the outermost substrate.

Examples of the raw material of the outermost substrate in the optical layered body having such a structure include glass, PET, and TAC. With such a structure, functional layers can be directly formed by application on the surface opposite to the viewer side surface of the outermost substrate, and therefore, employment of a roll-to-roll method in the production is not necessary, improving the productivity.

The functional layers are expressed as the functional layers A to C for convenience sake, and any of the functional layers may have a function of blocking light at any wavelength as long as the optical layered body as a whole satisfies the spectral transmittance.

In the case where the sesamol-type benzotriazole monomer is contained in the functional layer, the sesamol-type benzotriazole monomer is preferably contained in an amount of 5 to 30% by mass in a functional layer having a thickness of 10 µm. When the sesamol-type benzotriazole monomer is contained in an amount within such a range, the spectral transmittance described above can be satisfied. The sesamol-type benzotriazole monomer may be reacted with a resin component constituting the functional layer to be contained in the functional layer integrally with the resin component or contained alone in the functional layer without being reacted with a resin component constituting the functional layer.

Specifically, the functional layer in which the sesamol-type benzotriazole monomer is reacted with a resin component constituting the functional layer to be contained integrally with the resin component in the functional layer may be those formed using a composition for functional layers which contains 10 parts by mass of pentaerythritol triacrylate (PETA) and 90 parts by mass of a polymer that is an acrylic or acrylate polymer in which the sesamol-type benzotriazole monomer (A), methyl methacrylate (MMA) (B), and other components such as an UV absorber (e.g., "RUVA93" available from Otsuka Chemical Co., Ltd.) (C) are reacted to be bonded with the amount (X) of A being 10 to 55 parts by mass. The optical layered body of the present invention having a functional layer obtained as above can satisfy the spectral transmittance described above and shows excellent blue light blocking properties.

Specific examples of the sesamol-type benzotriazole monomer include those having a structure represented by the following formula (2).

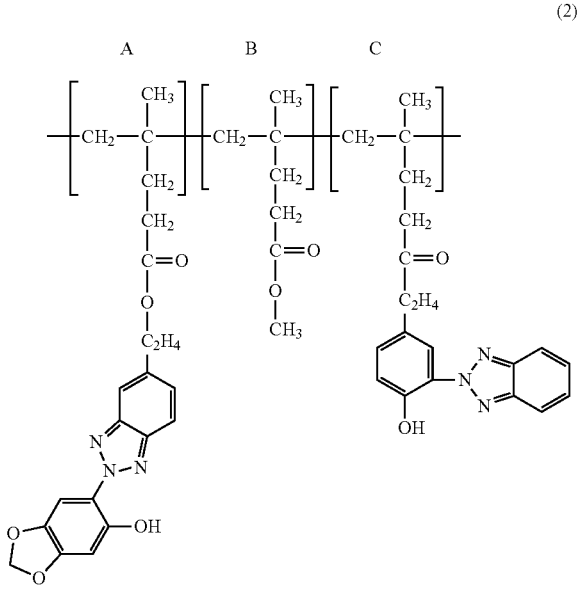

(2)

The material constituting the functional layer is not particularly limited, and examples thereof include polyester resins, acetate resins, polyether sulfone resins, polycarbonate resins, polyamide resins, polyimide resins, polyolefin resins, (meth) acrylic resins, polyvinyl chloride resins, polyvinylidene chloride resins, polystyrene resins, polyvinyl alcohol resins, polyarylate resins, and polyphenylene sulfide resins. Preferred among these are polyester resins, polycarbonate resins, and polyolefin resins.

In the case of using a substrate produced using a polyester resin such as polyethylene terephthalate (PET) or polyethylene naphthalate (PEN) as a raw material, it is known that the substrate is excited to become fluorescent under irradiation with UV light. Such fluorescence may affect the color tone of displayed images. However, the optical layered body of the present invention almost entirely blocks light at a wavelength of 410 nm or shorter as described above, and therefore, such fluorescence can be favorably prevented even in the case of using a polyester resin such as PET or PEN as a raw material of the substrate.

Examples of the substrate include an alicyclic amorphous olefin polymer (Cyclo-Olefin-Polymer: COP) film and a glass substrate. Alicyclic amorphous olefin polymer (COP) is a substrate produced using a compound such as a norbornene polymer, a monocyclic olefin polymer, a cyclic conjugated diene polymer, or a vinyl alicyclic hydrocarbon polymer. Examples thereof include ZEONEX and ZEONOR (norbornene resins) available from Zeon Corporation; SUMILITE FS-1700 available from Sumitomo Bakelite Co., Ltd.; ARTON (modified norbornene resin) available from JSR Corporation; APEL (cyclic olefin copolymer) available from Mitsui Chemicals, Inc.; Topas (cyclic olefin copolymer) available from Ticona; and OPTOREZ OZ-1000 series (alicyclic acrylic resins) available from Hitachi Chemical Co., Ltd.

Also, a preferred alternative substrate for triacetyl cellulose is FV series (low birefringence, low photoelastic film) available from Asahi Kasei Chemicals Corporation.

In the present invention, the substrate preferably has a thickness of 25 to 125 μm. With the thickness of the substrate of less than 25 μm, the optical layered body of the present invention may have insufficient mechanical strength. With the thickness of the substrate of more than 125 μm, the optical layered body of the present invention may have insufficient flexibility. The lower limit of the thickness of the substrate is more preferably 50 μm and the upper limit thereof is more preferably 115 μm. The lower limit is still more preferably 60 μm and the upper limit is still more preferably 100 μm.

The substrate may have a surface preliminarily subjected to etching treatment (e.g., sputtering, corona discharge, UV irradiation, electron beam irradiation, chemical conversion, and oxidation) or primer treatment. Such treatment performed in advance can improve the adhesiveness between the substrate and the functional layer formed thereon. The substrate surface may be optionally dedusted and cleaned by washing with a solvent or ultrasonic cleaning prior to the formation of the functional layer or the like.

The functional layer is a layer that ensures the predetermined spectral transmittance of the optical layered body of the present invention. For example, the functional layer is preferably formed from a composition for functional layers containing an ionizing-radiation-curable resin, which is a resin curable by UV rays or electron beams, and a photopolymerization initiator.

Examples of the ionizing-radiation-curable resin include compounds having one, or two or more unsaturated bonds such as acrylate functional group-containing compounds.

Examples of the compounds having one unsaturated bond include ethyl(meth)acrylate, ethylhexyl (meth)acrylate, styrene, methyl styrene, and N-vinylpyrrolidone. Examples of the compounds having two or more unsaturated bonds include polyfunctional compounds such as polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth) acrylate, and neopentyl glycol di(meth)acrylate, and reaction products between any of the above polyfunctional compounds and (meth)acrylate and the like (e.g., poly(meth) acrylate esters of polyhydric alcohols). The term "(meth) acrylate" as used herein includes methacrylate and acrylate.

In addition to the above compounds, a resin having a relatively low molecular weight with an unsaturated double bond, such as a polyester, polyether, acrylic, epoxy, urethane, alkyd, spiroacetal, polybutadiene, or polythiol polyene resin, may be used as the ionizing-radiation-curable resin.

The ionizing-radiation-curable resin may be used in combination with a solvent-drying-type resin (resin that can be turned into a coating only by drying a solvent added to adjust the solid content upon application, e.g., thermoplastic resin). Combination use with a solvent-drying-type resin enables effective prevention of defects of the coating. The solvent-drying-type resin to be used in combination with the ionizing-radiation-curable resin is not particularly limited, and any thermoplastic resin may be used, in general.

The thermoplastic resin is not particularly limited. Examples thereof include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, rubber, and elastomers. The thermoplastic resin is preferably amorphous and soluble in an organic solvent (in particular, a common solvent which dissolves various polymers and curable compounds). Particularly preferred from the viewpoints of film formability, transparency, and weather resistance are styrene resins, (meth)acrylic resins, alicyclic olefin resins, polyester resins, and cellulose derivatives (e.g., cellulose esters).

The composition for functional layers may contain a thermosetting resin.

The thermosetting resin is not particularly limited. Examples thereof include phenol resins, urea resins, diallylphthalate resins, melamine resins, guanamine resins, unsaturated polyester resins, polyurethane resins, epoxy resins, aminoalkyd resins, melamine-urea co-condensed resins, silicone resins, and polysiloxane resins.

The photopolymerization initiator is not particularly limited, and a known initiator may be used. Specific examples of the photopolymerization initiator include acetophenones, benzophenones, Michler-Benzoyl benzoate, α-amyloxim ester, thioxanthones, propiophenones, benzyls, benzoins, and acyl phosphine oxides. The initiator is preferably used in admixture with a photosensitizer. Specific examples thereof include n-butylamine, triethylamine, and poly-n-butylphosphine.

For a resin having a radical polymerizable unsaturated group as the ionizing-radiation-curable resin, the photopolymerization initiator is preferably one of acetophenones, benzophenones, thioxanthones, benzoin, and benzoin methyl ether, or a mixture thereof. For a resin having a cation polymerizable functional group as the ionizing-radiation-curable resin, the photo-polymerization initiator is preferably one of aromatic diazonium salts, aromatic sulfonium salts, aromatic iodonium salts, metallocene compounds, and benzoin sulfonic esters, or a mixture thereof.

The amount of the photopolymerization initiator in the composition for functional layers is preferably 1 to 10 parts by mass relative to 100 parts by mass of the ionizing-radiation-curable resin. If the amount is less than 1 part by mass, the functional layer in the optical layered body of the present invention may have insufficient hardness. If the amount is more than 10 parts by mass, ionizing radiation may not reach the depth of the formed film and may fail to urge internal curing. Thereby, the functional layer may fail to have a desired surface hardness (e.g., pencil hardness of 2H or higher).

The lower limit of the amount of the photo-polymerization initiator is more preferably 2 parts by mass and the upper limit thereof is more preferably 8 parts by mass. With the amount of the photopolymerization initiator within this range, the hardness distribution in the thickness direction can be prevented and the uniform hardness is likely to be achieved.

The composition for functional layers may contain a solvent.

The solvent to be used depends on the type and solubility of the resin component to be used. Examples thereof include ketones (e.g., acetone, methyl ethyl ketone, methyl isobutyl ketone, cyclohexanone, diacetone alcohol), ethers (e.g., dioxane, tetrahydrofuran, propylene glycol monomethyl ether, propylene glycol monomethyl ether acetate), aliphatic hydrocarbons (e.g., hexane), alicyclic hydrocarbons (e.g., cyclohexane), aromatic hydrocarbons (e.g., toluene, xylene), halocarbons (e.g., dichloromethane, dichloroethane), esters (e.g., methyl acetate, ethyl acetate, butyl acetate), water, alcohols (e.g., ethanol, isopropanol, butanol, cyclohexanol), cellosolves (e.g., methyl cellosolve, ethyl cellosolve), cellosolve acetates, sulfoxides (e.g., dimethyl sulfoxide), and amides (e.g., dimethylformamide, dimethylacetamide). These solvents may also be used in admixture.

The proportion of the raw materials (solid content) in the composition for functional layers is not particularly limited, and it is generally 5 to 70% by mass, particularly preferably 25 to 60% by mass.

For the purposes of increasing the hardness of the functional layer, suppressing curing shrinkage, adjusting the refractive index, imparting antiglare properties, and the like, the composition for functional layers may contain any of conventionally known dispersants, surfactants, antistatic agents, silane coupling agents, thickeners, anti-coloring agents, colorants (pigments, dyes), defoamers, leveling agents, flame retardants, UV absorbers, tackifiers, polymerization inhibitors, antioxidants, surface modifiers, lubricants, and like additives.

The composition for functional layers may contain a photosensitizer. Specific examples thereof include n-butylamine, triethylamine, and poly-n-butylphosphine.

The composition for functional layers may be prepared by any method which allows the components to be uniformly mixed. The method may be one using any known device such as a paint shaker, a bead mill, a kneader, or a mixer.

The composition for functional layers may be applied to the substrate by any method. Examples of the method include known methods such as spin coating, dipping, spraying, die coating, bar coating, roll coating, meniscus coating, flexo printing, screen printing, or bead coating.

The film formed by application of the composition for functional layers to the substrate is preferably heated and/or dried as appropriate and then cured by, for example, irradiation with active energy rays.

The irradiation with active energy rays may be irradiation with UV rays or electron beams. Specific examples of the source of UV rays include an ultra-high pressure mercury lamp, a high-pressure mercury lamp, a low-pressure mercury lamp, a carbon-arc lamp, a black light fluorescent lamp, and a metal halide lamp. The wavelength of the UV rays may be 190 to 380 nm. Specific examples of the electron beam source include various electron beam accelerators of Cockcroft-Walton type, Van de graaff type, resonant transformer type, insulated core transformer type, linear type, dynamitron type, and high-frequency type.

The thickness (after cured) of the functional layer is 0.1 to 100 μm, preferably 0.8 to 20 μm. The thickness of the functional layer is a value measured through observation of the cross section using an electron microscope (SEM, TEM, STEM).

The optical layered body of the present invention preferably has an arithmetic average roughness Ra on the surface opposite to the substrate side surface of the functional layer of less than 10 nm.

When Ra satisfies the above preferable value, the optical layered body of the present invention is a clear film, having very excellent transparency. The upper limit of Ra is more preferably 8 nm. The arithmetic average roughness Ra is a value measured by a method in conformity with JIS B 0601-1994.

The functional layer having such Ra can be obtained by using the composition for functional layers described above.

The functional layer may have projections and depressions on the surface opposite to the substrate side surface.

The presence of projections and depressions on the surface opposite to the substrate side surface of the functional layer can impart, for example, antiglare properties and/or blocking resistance to the optical layered body of the present invention.

In the case where the functional layer has antiglare properties, for example, an antiglare agent is added to the composition for functional layers for forming such a functional layer.

The antiglare agent is not particularly limited, and various known inorganic or organic fine particles can be used.

The average particle size of the fine particles is not particularly limited, and may be commonly about 0.01 to 20 μm.

The fine particles may have either spherical or elliptical shape. The spherical shape is preferred.

The fine particles exhibit antiglare properties and are preferably transparent fine particles. Specific examples of such fine particles include silica beads in the case of inorganic fine particles and plastic beads in the case of organic fine particles.

Specific examples of the plastic beads include styrene beads (refractive index: 1.60), melamine beads (refractive index: 1.57), acrylic beads (refractive index: 1.49), acryl-styrene beads (refractive index: 1.54), polycarbonate beads, and polyethylene beads.

In the case where the functional layer has antiglare properties, the average interval (Sm) between the projections and depressions on the surface, the average tilt angle ($\theta a$) of the projections and depressions, the arithmetic average roughness (Ra) of the projections and depressions, and the ten-point average roughness (Rz) of the projections and depressions preferably satisfy the following inequalities from the standpoint of ensuring antiglare by blurring the edge portions of a reflected image and obtaining an optical layered body that enables display of brilliant images having an excellent contrast in both a bright room and a dark room by eliminating large diffusion to prevent generation of stray light as well as keeping an appropriate regular transmission part. When any of $\theta a$, Ra, and Rz is less than the lower limit, reflection of external light may not be suppressed. When any of $\theta a$, Ra, and Rz is more than the upper limit, the regular transmission component may be reduced to lower the brightness of the images, reduction in contrast in a bright room may occur due to an increase in the diffusion reflection of external light, or reduction in contrast in a dark room may occur due to an increase of stray light from transmitted image light.

In the structure of the present invention, when Sm is less than the lower limit, control of agglomeration may be difficult. When Sm is more than the upper limit, minute nuances of images cannot be reproduced, problematically resulting in display of rough images.

$$50 \text{ μm} < Sm < 600 \text{ μm}$$

$$0.05° < \theta a < 1.5°$$

$$0.02 \text{ μm} < Ra < 0.30 \text{ μm}$$

$$0.05 \text{ μm} < Rz < 2.00 \text{ μm}$$

From the above-mentioned standpoints, the projections and depressions on the functional layer more preferably satisfy the following inequalities.

$$100 \text{ μm} < Sm < 400 \text{ μm}$$

$$0.1° < \theta a < 1.2°$$

$$0.02 \text{ μm} < Ra < 0.15 \text{ μm}$$

$$0.30 \text{ μm} < Rz < 1.20 \text{ μm}$$

The projections and depressions on the functional layer still more preferably satisfy the following inequalities.

$$120 \text{ μm} < Sm < 300 \text{ μm}$$

$$0.1° < \theta a < 0.5°$$

$$0.02 \text{ μm} < Ra < 0.12 \text{ μm}$$

$$0.30 \text{ μm} < Rz < 0.80 \text{ μm}$$

Sm, Ra, and Rz as used herein are values obtained by a method in conformity with JIS B 0601-1994. $\theta a$ is a value obtained based on the definition in the operation manual (revised on Jul. 20, 1995) of a surface profilometer: SE-3400 (available from Kosaka Laboratory Ltd.). As illustrated in FIG. 2, $\theta a$ can be obtained by arc tangent of the total of the heights $((h_1+h_2+h_3+ \ldots +h_n))$ of rojections present in the reference length L ($\theta a = \tan^{-1}\{(h_1+h_2+h_3+ \ldots +h_n)/L\}$).

These Sm, $\theta a$, Ra, and Rz can be obtained, for example, by the measurement using a surface profilometer SE-3400 (available from Kosaka Laboratory Ltd.).

The conditions for the measurement using a surface profilometer include a cut-off value of 2.5 mm and an evaluation length of 12.5 mm.

In the case where the functional layer has antiblocking properties, the functional layer preferably contains, for example, an antiblocking agent.

The materials constituting the antiblocking agent may be one, or two or more inorganic compounds including oxides (e.g., aluminum oxide, magnesium oxide, silica, calcium oxide, titanium oxide, zinc oxide), hydroxides (e.g., aluminum hydroxide, magnesium hydroxide, calcium hydroxide), carbonates (e.g., magnesium carbonate, calcium carbonate), sulfates (e.g., calcium sulfate, barium sulfate), silicates (e.g., magnesium silicate, aluminum silicate, calcium silicate, aluminosilicate), and others (e.g., kaolin, talc, diatom earth).

The average particle size of the inorganic compound-type antiblocking agent depends on the thickness of the functional layer, and is preferably about 0.01 to 8 μm in the functional layer having a thickness of 5 μm. If the average particle size is less than 0.01 μm, the projections and depressions on the surface of the functional layer are unfavorably small, resulting in a poor antiblocking effect. If the average particle size is more than 8 μm, the projections and depressions on the surface of the functional layer are too large, which may cause scratches upon friction of the films with each other. The lower limit of the average particle size of the inorganic compound-type antiblocking agent is more preferably 0.05 μm.

The antiblocking agent may contain, as the raw material, one or two or more organic compounds including fine powder of a high density polyethylene, high-polymer polyethylene having a molecular weight of 300,000 or more, polypropylene, polycarbonate, polyamide, polyester, melamine resin, diallylphthalate resin, acrylic resin, or like substance.

The amount of the antiblocking agent is preferably 0.01 to 6 parts by mass, more preferably 2 to 5 parts by mass relative to 100 parts by mass of the resin component constituting the functional layer.

If the amount of the antiblocking agent is less than 0.01 parts by mass, formation of the projections and depressions on the surface of the functional layer may be insufficient, resulting in insufficient antiblocking properties. If the amount is more than 6 parts by mass, the transparency of the functional layer may be lowered.

The optical layered body of the present invention preferably has multiple deposition layers on the surface opposite to the substrate side surface of the functional layer.

With the multiple deposition layers, the optical layered body of the present invention can more favorably satisfy the requirement of the spectral transmittance described above.

The deposition layers are preferably formed by deposition of an inorganic substance such as silicon (Si), aluminum (Al), magnesium (Mg), calcium (Ca), potassium (K), tin (Sn), sodium (Na), boron (B), titanium (Ti), lead (Pb), zirconium (Zr), yttrium (Y), or niobium (Nb), or an inorganic oxide. In particular, deposition layers of silicon (Si) and niobium (Nb) are preferred.

The deposition layers are preferably formed by sputtering. The formation of the deposition layers by sputtering enables more precise control of the thickness of the layer upon multilayer deposition.

The deposition layers each preferably have a thickness of 3 to 150 nm, and 5 to 20 layers are preferably deposited.

Having such deposition layers on the functional layer, the optical layered body of the present invention can prevent coloring due to the deposition layers, more favorably satisfying the requirement of the spectral transmittance mentioned above.

The optical layered body of the present invention preferably further includes an invisiblizing layer having a layered structure including multiple layers different in refractive index.

The optical layered body of the present invention is favorably used for an image display device equipped with a touch panel. The presence of the invisiblizing layer can prevent a sensor electrode (transparent electrode layer) formed of an inorganic transparent conductive material such as ITO from being seen on the display screen.

The invisiblizing layer is not particularly limited, and a conventionally known layer may be used. For example, it preferably has a layered structure including multiple layers different in refractive index. Specifically, it preferably has a layered structure including a high-refractive index layer having a higher refractive index than the inorganic transparent conductive material described above and a low-refractive index layer having a lower refractive index than the high-refractive index layer.

The high-refractive index layer preferably has a refractive index of 1.50 or higher and 2.00 or lower. The lower limit of the refractive index of the high-refractive index layer is more preferably 1.60 and the upper limit thereof is more preferably 1.75.

The lower limit of the thickness of the high-refractive index layer is preferably 10 nm and the upper limit thereof is preferably 200 nm. The lower limit is more preferably 30 nm and the upper limit is more preferably 100 nm.

The high-refractive index layer is not particularly limited as long as it has a higher refractive index than the inorganic transparent conductive material described above. The high-refractive index layer is preferably constituted by high-refractive index fine particles and a binder resin.

Examples of the high-refractive index fine particles include metal oxide fine particles.

Examples of the metal oxide fine particles include particles of titanium oxide ($TiO_2$, refractive index: 2.3 to 2.7), niobium oxide ($Nb_2O_5$, refractive index: 2.33), zirconium oxide ($ZrO_2$, refractive index: 2.10), antimony oxide ($Sb_2O_5$, refractive index: 2.04), tin oxide ($SnO_2$, refractive index: 2.00), tin-doped indium oxide (ITO, refractive index: 1.95 to 2.00), cerium oxide ($CeO_2$, refractive index: 1.95), aluminum-doped zinc oxide (AZO, refractive index: 1.90 to 2.00), gallium-doped zinc oxide (GZO, refractive index: 1.90 to 2.00), antimony-doped zinc oxide ($ZnSb_2O_6$, refractive index: 1.90 to 2.00), zinc oxide (ZnO, refractive index: 1.90), yttrium oxide ($Y_2O_3$, refractive index: 1.87), antimony-doped tin oxide (ATO, refractive index: 1.75 to 1.85), or phosphorus-doped tin oxide (PTO, refractive index: 1.75 to 1.85). In terms of refractive index, preferred among these are particles of zirconium oxide.

The binder resin included in the high-refractive index layer is not particularly limited. From the standpoint of increasing the surface hardness, preferred is a thermosetting resin or a polymer (crosslinked product) of a photopolymerizable compound, and more preferred is a polymer of a photopolymerizable compound.

Examples of such a binder resin include those exemplified as the resin component included in the functional layer described above.

The high-refractive index layer can be formed by the same method as that employed for the formation of the functional layer described above. Specifically, in the case where the high-refractive index layer is formed on one surface of the functional layer, a composition for high-refractive index layers containing at least high-refractive index fine particles and a binder resin is applied to the surface of the functional layer, the formed coating film is dried, and then the dried coating film is irradiated with UV rays or the like so that the binder resin is cured, thereby forming the high-refractive index layer.

The low-refractive index layer is a layer having a lower refractive index than the high-refractive index layer. Specifically, the lower limit of the refractive index thereof is preferably 1.35 and the upper limit thereof is preferably 1.55. The lower limit is more preferably 1.40 and the upper limit is more preferably 1.50.

The lower limit of the thickness of the low-refractive index layer is preferably 1 nm and the upper limit thereof is preferably 200 nm. The lower limit is more preferably 5 nm and the upper limit is more preferably 100 nm.

Examples of the low-refractive index layer include a layer formed of low-refractive index fine particles and a binder resin or a layer formed of a lower refractive index resin.

Examples of the low-refractive index fine particles include solid or hollow particles of silica or magnesium fluoride. Preferred among these are hollow silica particles, and such hollow silica particles can be produced by the production method described in Examples of JP 2005-099778 A.

Examples of the binder resin included in the low-refractive index layer include those exemplified as the binder resin included in the high-refractive index layer described above.

It is to be noted that the binder resin may be blended with a fluorine atom-introduced resin or a low-refractive index material such as organopolysiloxane.

Examples of the low-refractive index resin include a fluorine atom-introduced resin or a low-refractive index resin such as organopolysiloxane.

The low-refractive index layer can be formed by the same method as that employed for the formation of the functional layer. Specifically, a composition for low-refractive index layers containing at least low-refractive index fine particles and a binder resin is applied to the surface of the high-refractive index layer, the formed coating film is dried, and the dried coating film is irradiated with UV rays or the like so that the binder resin is cured, thereby forming the low-refractive index layer.

A middle-refractive index layer having a refractive index that is lower than the refractive index of the high-refractive index layer and higher than the refractive index of the low-refractive index layer may be provided between the high-refractive index layer and the low-refractive index layer.

The invisiblizing layer may be formed on either one of or both of the surfaces of the functional layer.

The optical layered body of the present invention preferably has antistatic properties.

Having antistatic properties, the optical layered body of the present invention can be particularly preferably used for an IPS liquid crystal display device. In the case where the liquid crystal display device is an IPS liquid crystal display device, the upper limit of the surface resistance value of the optical layered body of the present invention is preferably $10^{10} \Omega/\square$, more preferably $10^9 \Omega/\square$. In particular, in the case where the liquid crystal display device is an IPS liquid crystal display device with an in-cell touch panel, the lower limit of the surface resistance value of the optical layered body of the present invention is preferably $10^7 \Omega/\square$ and the upper limit thereof is preferably $10^{10} \Omega/\square$. The lower limit is more preferably $10^8 \Omega/\square$ and the upper limit is more preferably $10^9 \Omega/\square$.

The antistatic properties can be achieved by incorporating an antistatic agent in any layer included in the optical layered body of the present invention.

The antistatic agent is not particularly limited and a conventionally known agent can be used. Examples thereof include cationic antistatic agents such as quaternary ammonium salts, fine particles of tin-doped indium oxide (ITO) or the like, and conductive polymers.

In the case where the antistatic agent is used, the amount thereof is preferably 1 to 30% by mass relative to the total mass of all the solid contents.

The optical layered body of the present invention may include any additional layer such as an antifouling layer or another functional layer in addition to the functional layer or the like described above.

The antifouling layer is a layer with which stains (e.g., fingerprints, water- or oil-based ink, pencils) are not likely to be left on the outermost surface of the image display device including the optical layered body of the present invention and even in the case where the outermost surface is stained, the stains can be easily wiped off. The formation of the antifouling layer enables improvement of antifouling properties and scratch resistance of the optical layered body of the present invention.

The antifouling layer can be formed from, for example a composition containing a staining inhibitor and a resin.

The staining inhibitor mainly aims to prevent staining on the outermost surface of the optical layered body of the present invention and also imparts the scratch resistance to the optical layered body of the present invention.

Examples of the staining inhibitor include fluorine compounds, silicon compounds, and mixtures of these compounds. More specifically, examples thereof include silane coupling agents having a fluoroalkyl group such as 2-perfluorooctylethyl triaminosilane. In particular, one having an amino group is preferably used.

The resin is not particularly limited, and examples thereof include those exemplified for the composition for functional layers described above.

The antifouling layer can be formed, for example, on the functional layer. In particular, the antifouling layer is preferably formed to be the outermost surface layer.

The formation of the antifouling layer can be replaced by impartment of antifouling properties to the functional layer itself.

In the optical layered body of the present invention, the additional layer described above is commonly provided on the viewer side (outermost surface side) of the substrate. Alternatively, it may be also provided on the color filter side of the substrate.

The present invention also encompasses an image display device or touch panel sensor including the optical layered body of the present invention.

The image display device including the optical layered body of the present invention is not particularly limited, and examples thereof include known display devices such as liquid crystal display devices, organic electroluminescence (organic EL) display devices, and image display devices including a touch panel mounted on any of these display devices.

The touch panel sensor is not particularly limited, and examples thereof include conventionally known touch panel sensors.

The image display device including the optical layered body of the present invention can be obtained by, for example, transferring the optical layered body of the present invention to a transfer target such as a polarizer by a transferring method using a transfer film including the optical layered body of the present invention.

The transfer film has, for example, a structure in which a release film is attached to the functional layer (the surface opposite to the substrate side surface) of the optical layered body of the present invention. In the transfer method using such a transfer film, the transfer film is set in such a manner that the optical layered body of the present invention is positioned on the transfer target side, and the release film is peeled from the transfer film so that the optical layered body of the present invention is transferred to the transfer target.

The release film is not particularly limited and, for example, an untreated polyethylene terephthalate (PET) film is favorably used. The untreated PET film is excellent in easy removal from the functional layer, as well as being inexpensive to keep the production cost of the transfer film low. The release film before being peeled serves as a protection film for protecting the functional layer. Being tough in comparison with a COP film or a surface-treated PET film, the untreated PET film favorably functions as the protection film. For example, if the release film is a film to which a Si-based release agent containing a silicon atom is applied, the release film is easily removable but components of the release agent may be transferred to the functional layer upon transferring of the optical layered body of the present invention, possibly affecting the spectral transmittance described above. In contrast, when the release film is an untreated PET film, it contains no components which may be transferred to the functional layer upon transferring of the optical layered body of the present invention and therefore, the optical characteristics after the transferring are not changed.

Advantageous Effects of Invention

The optical layered body of the present invention having a structure as described above can have excellent blue light blocking properties without affecting the color tone of displayed images.

Accordingly, the optical layered body of the present invention is favorably used for image display screens of image display devices such as liquid crystal displays (LCD), plasma displays (PDP), organic/inorganic electroluminescence displays (LED), or electronic paper, and touch panel sensors.

DESCRIPTION OF EMBODIMENTS

Figure 1:
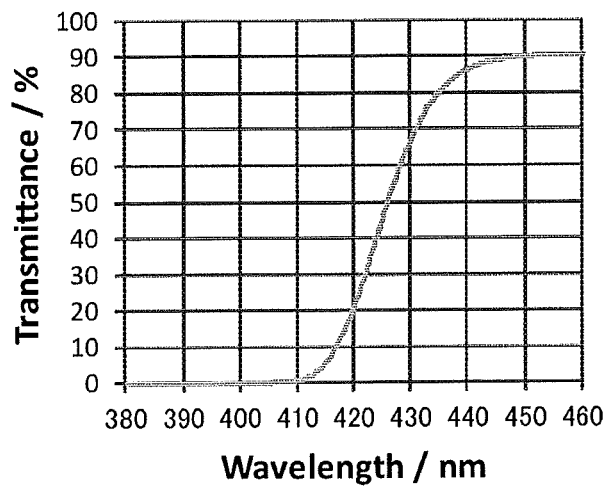
FIG. 1 is a graph showing an example of the spectral transmittance of the optical layered body of the present invention.
Figure 2:
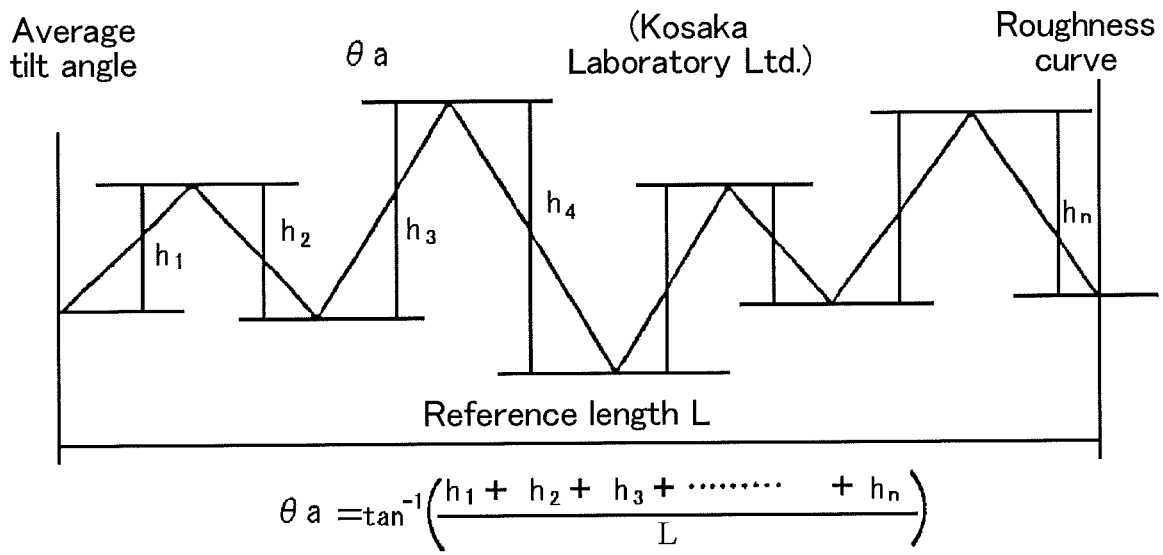
FIG. 2 is a view for explaining how to measure ea.

The present invention will be more specifically described in the following with reference to, but not limited to, examples and comparative examples.

The term "part(s)" or "%" herein is based on the mass, unless otherwise specified.

The present invention will be more specifically described in the following with reference to, but not limited to, examples and comparative examples.

Example 1

(Synthesis of a Sesamol-Type Benzotriazole Monomer)

A 200-mL four-neck flask equipped with an Allihn condenser, a mercury thermometer, and a stirrer was charged with 4.0 g (0.013 mol) of 6-[5-(2-hydroxyethyl)-2H-benzotriazole-2-yl]benzo[1,3]dioxol-5-ol, 40 mL of toluene, 1.8 g (0.021 mol) of methacrylic acid, and 0.4 g (0.004 mol) of methanesulfonic acid, and reflux dehydration was performed at 110° C. to 115° C. for four hours.

Next, 30 mL of water and 0.6 g (0.006 mol) of sodium carbonate were added, the mixture was allowed to stand still, and an aqueous layer separated at the bottom was removed. An amount of 0.2 g of activated charcoal was added to the resultant material and stirred under reflux for bleaching.

The bleached material was filtered, and 40 mL of toluene was recovered from the filtrate under reduced pressure. To the toluene was added 100 mL of isopropyl alcohol, and a precipitated crystal was filtered out. The crystal was washed with 40 mL of isopropyl alcohol and then dried at 40° C. under reduced pressure, thereby obtaining 4.2 g of a yellow crystal.

Thus obtained yellow crystal in an amount of 4.2 g was subjected to repulp washing using isopropyl alcohol and dried at 40° C. under reduced pressure, thereby providing 3.4 g of 2-[2-(6-hydroxybenzo[1,3]dioxol-5-yl)-2H-benzotriazol-5-yl]ethylmethacrylate as a sesamol-type benzotriazole monomer.

(Synthesis of a Sesamol-Type Benzotriazole Monomer-Reaction Bonded Acrylic Polymer)

A four-neck flask equipped with a Dimroth condenser, a mercury thermometer, a nitrogen gas inlet tube, and a stirrer were charged with X parts by mass of the synthesized 2-[2-(6-hydroxybenzo[1,3]dioxol-5-yl)-2H-benzotriazol-5-yl]ethylmethacrylate, (100−X) parts by mass of methyl methacrylate as another monomer, 20 parts by mass of toluene and 20 parts by mass of methyl ethyl ketone as solvents, and 0.6 parts by mass of 1,1′-azobis (cyclohexane-1-carbonitrile) as a polymerization initiator. The air inside the flask was nitrogen-substituted at a nitrogen gas flow rate of 10 mL/min for one hour under stirring, and then polymerization reaction was performed under reflux at a reaction temperature of 90° C. to 96° C. for 10 hours. X represents a value described later.

After the polymerization reaction, 10 parts by mass of toluene and 10 parts by mass of MEK were added, thereby preparing 160.6 parts by mass of a solution of a sesamol-type benzotriazole monomer-reaction bonded acrylic polymer (1).

A polyfunctional monomer (PET-30 (pentaerythritol triacrylate) available from Nippon Kayaku Co., Ltd.) and the obtained sesamol-type benzotriazole monomer-reaction bonded acrylic polymer (1) (polymer in which a sesamol-type benzotriazole monomer at a mass ratio X of 20 parts by mass is reaction-bonded to MMA and a UV absorber) were mixed at a solid content mass ratio of 50:50, and diluted with a solvent (MEK and toluene, mass ratio=50:50) to a solid content of 25%, thereby preparing a resin composition.

Next, 400 parts by mass of the obtained resin composition was mixed with a photopolymerization initiator (IRGACURE 184 and IRGACURE 819 available from BASF SE blended at a mass ratio of 50:50, 4 parts by mass) and a leveling agent (F-568 available from DIC Corporation, 4 parts by mass), and stirred well to provide a composition for functional layers.

The obtained composition for functional layers was applied to a TAC substrate having a thickness of 25 μm using a Mayer bar, dried, and UV-cured. Thus, an optical layered body including a functional layer having a thickness of 10 μm was produced.

Example 2

An optical layered body was produced as in Example 1, except that the polyfunctional monomer (PET-30 available from Nippon Kayaku Co., Ltd.) and the sesamol-type benzotriazole monomer-reaction bonded acrylic polymer (1) (polymer in which a sesamol-type benzotriazole monomer at a mass ratio X of 20 parts by mass was reaction-bonded to MMA and a UV absorber) were mixed at a solid content mass ratio of 10:90.

Example 3

A sesamol-type benzotriazole monomer-reaction bonded acrylic polymer (2) was synthesized as in Example 1, except that the mass ratio X of the sesamol-type benzotriazole monomer was changed to 30 parts by mass.

An optical layered body was produced as in Example 1, except that the polyfunctional monomer (PET-30 available from Nippon Kayaku Co., Ltd.) and the sesamol-type benzotriazole monomer-reaction bonded acrylic polymer (2) (polymer in which a sesamol-type benzotriazole monomer at a mass ratio X of 30 parts by mass was reaction-bonded to MMA and a UV absorber) were mixed at a solid content mass ratio of 10:90.

Example 4

An optical layered body was produced as in Example 1, except that the polyfunctional monomer (PET-30 available from Nippon Kayaku Co., Ltd.) and the sesamol-type benzotriazole monomer-reaction bonded acrylic polymer (1) (polymer in which a sesamol-type benzotriazole monomer at a mass ratio X of 20 parts by mass was reaction-bonded to MMA and a UV absorber) were mixed at a solid content mass ratio of 70:30.

Example 5

A sesamol-type benzotriazole monomer-reaction bonded acrylic polymer (3) was synthesized as in Example 1, except that the mass ratio X of the sesamol-type benzotriazole monomer was changed to 55 parts by mass.

An optical layered body was produced as in Example 1, except that the polyfunctional monomer (PET-30 available from Nippon Kayaku Co., Ltd.) and the sesamol-type benzotriazole monomer-reaction bonded acrylic polymer (3) (polymer in which a sesamol-type benzotriazole monomer at a mass ratio of 55 parts by mass was reaction-bonded to MMA and a UV absorber) were mixed at a solid content mass ratio of 10:90.

Example 6

Two layered films were prepared in which a functional layer was formed as in Example 1, except that the polyfunctional monomer (PET-30 available from Nippon Kayaku Co., Ltd.) and the sesamol-type benzotriazole monomer-reaction bonded acrylic polymer (1) (polymer in which a sesamol-type benzotriazole monomer at a mass ratio X of 20 parts by mass was reaction-bonded to MMA and a UV absorber) were mixed at a solid content mas ratio of 80:20. The layered films were attached to each other using a transparent adhesive (e.g., "M3014" available from Lintec Corporation) in such a manner that the functional layer of one layered film faced the TAC substrate of the other layered film. Thus, an optical layered body was produced.

Example 7

A functional layer was formed on one surface of a TAC substrate as in Example 1, except that the polyfunctional monomer (PET-30 available from Nippon Kayaku Co., Ltd.) and the sesamol-type benzotriazole monomer-reaction bonded acrylic polymer (1) (polymer in which a sesamol-type benzotriazole monomer at a mass ratio X of 20 parts by mass was reaction-bonded to MMA and a UV absorber) were mixed at a solid content mass ratio of 80:20. The same functional layer was also formed on the opposite surface of the TAC substrate. Thus, an optical layered body was produced.

Example 8

A functional layer was formed as in Example 1, except that the polyfunctional monomer (PET-30 available from Nippon Kayaku Co., Ltd.) and the sesamol-type benzotriazole monomer-reaction bonded acrylic polymer (1) (polymer in which a sesamol-type benzotriazole monomer at a mass ratio X of 20 parts by mass was reaction-bonded to MMA and UV absorber) were mixed at a solid content mass ratio of 80:20.

A powerful acrylic adhesive (product name: SK-Dyne 1604N available from Soken Chemical & Engineering Co., Ltd.) in an amount of 100 parts by mass as a solid content and a curing agent (product name: Coronate L45 available from Nippon Polyurethane Industry Co., Ltd.) in an amount of 2 parts by mass as a solid content were blended, and diluted with toluene to a solid content of 25%, thereby preparing an application liquid (adhesive 1).

Then, the adhesive 1 and the sesamol-type benzotriazole monomer-reaction bonded acrylic polymer (1) (polymer in which a sesamol-type benzotriazole monomer at a mass ratio X of 20 parts by mass was reaction-bonded to MMA and a UV absorber) were mixed at a solid content mass ratio of 90:10. The mixture was applied to the surface opposite to the functional layer side surface of the TAC substrate, and dried at 100° C. for two minutes, thereby forming an adhesive layer having a thickness of 8 μm. A light-release PET separator (P381031 available from Lintec Corporation) was further attached via the adhesive layer.

In addition, an adhesive layer having a thickness of 8 μm was similarly formed on the surface opposite to the TAC substrate side surface of the functional layer. Thus, an optical layered body was produced.

Example 9

A functional layer was formed as in Example 1, except that the polyfunctional monomer (PET-30 available from Nippon Kayaku Co., Ltd.) and the sesamol-type benzotriazole monomer-reaction bonded acrylic polymer (1) (polymer in which a sesamol-type benzotriazole monomer at a mass ratio X of 20 parts by mass was reaction-bonded to MMA and a UV absorber) were mixed at a solid content mass ratio of 80:20.

A powerful acrylic adhesive (product name: SK-Dyne 1604N available from Soken Chemical & Engineering Co., Ltd.) in an amount of 100 parts by mass as a solid content and a curing agent (product name: Coronate L45 available from Nippon Polyurethane Industry Co., Ltd.) in an amount of 2 parts by mass as a solid content were blended, and diluted with toluene to a solid content of 25%, thereby preparing an application liquid (adhesive 1).

Then, the adhesive 1 and the sesamol-type benzotriazole monomer-reaction bonded acrylic polymer (3) (polymer in which a sesamol-type benzotriazole monomer at a mass ratio X of 55 parts by mass was reaction-bonded to MMA and a UV absorber) were mixed at a solid content mass ratio of 90:10. The mixture was applied to the surface opposite to the functional layer side surface of the TAC substrate, and dried at 100° C. for two minutes, thereby forming an adhesive layer having a thickness of 8 μm. A light-release PET separator (P381031 available from Lintec Corporation) was further attached via the adhesive layer. Thus, an optical layered body was produced.

Example 10

A functional layer was formed as in Example 1, except that the composition for functional layers prepared by mixing the polyfunctional monomer (PET-30 available from Nippon Kayaku Co., Ltd.) and the sesamol-type benzotriazole monomer-reaction bonded acrylic polymer (1) (polymer in which a sesamol-type benzotriazole monomer at a mass ratio X of 20 parts by mass was reaction-bonded to MMA and a UV absorber) at a solid content mass ratio of 10:90 was applied to a glass plate having a thickness of 1,000 μm using a Mayer bar. Thus, an optical layered body was produced.

Example 11

A functional layer was formed as in Example 1, except that the composition for functional layers prepared by mixing the polyfunctional monomer (PET-30 available from Nippon Kayaku Co., Ltd.) and the sesamol-type benzotriazole monomer-reaction bonded acrylic polymer (1) (polymer in which a sesamol-type benzotriazole monomer at a mass ratio X of 20 parts by mass was reaction-bonded to MMA and a UV absorber) at a solid content mass ratio of 80:20 was applied to a glass plate having a thickness of 1,000 μm using a Mayer bar. Moreover, another functional layer was similarly formed thereon. Thus, an optical layered body was produced.

Example 12

BPE-20 (ethylene oxide-modified bisphenol A diacrylate available from Dai-Ichi Kogyo Seiyaku Co., Ltd.) and the sesamol-type benzotriazole monomer-reaction bonded acrylic polymer (1) (polymer in which a sesamol-type benzotriazole monomer at a mass ratio X of 20 parts by mass was reaction-bonded to MMA and a UV absorber) were mixed at a solid content mass ratio of 10:90, and added to methyl isobutyl ketone (MIBK) to a solid content of 40% and stirred to be dissolved. Thus, a solution (1) was obtained. The obtained solution (1) was applied to an untreated surface of an untreated PET film substrate (A4100 available from Toyobo co., Ltd.) using a Mayer bar, dried, and UV-cured, thereby preparing a functional film having a functional layer having a thickness of 10 μm.

Further, UV-3310B (The Nippon Synthetic Chemical Industry Co., Ltd.) was added to methyl ethyl ketone (MEK) to a solid content of 40% and stirred to be dissolved. The obtained composition was applied to the functional layer of the obtained functional film using a Mayer bar, dried, and UV-cured, thereby forming a base material layer having a thickness of 25 μm. Thus, an optical layered body was produced.

The obtained optical layered body functions as a transfer film. The layered body in which a functional layer was formed can be transferred to a transfer target by contacting the base material layer with the transfer target and then peeling the untreated PET film substrate.

Example 13

A functional film was produced as in Example 12, except that the composition for functional layers used consisted only of BPE-20 (available from Dai-Ichi Kogyo Seiyaku Co., Ltd., ethylene oxide-modified bisphenol A diacrylate). UV-3310B (available from The Nippon Synthetic Chemical Industry Co., Ltd.) and the sesamol-type benzotriazole monomer-reaction bonded acrylic polymer (1) (polymer in which a sesamol-type benzotriazole monomer at a mass ratio X of 20 parts by mass was reaction-bonded to MMA and a UV absorber) were mixed at a solid content mass ratio of 60:40, added to methyl ethyl ketone (MEK) to a solid content of 40%, and stirred to be dissolved, thereby preparing a composition. The obtained composition was applied to the functional layer of the functional film using a Mayer bar, dried, and UV-cured, thereby forming a base material layer having a thickness of 25 μm. Thus, an optical layered body was produced.

The obtained optical layered body functions as a transfer film. The layered body in which a functional layer was formed can be transferred to a transfer target by contacting the base material layer with the transfer target and then peeling the untreated PET film substrate.

Comparative Example 1

An optical layered body was produced as in Example 1, except that the polyfunctional monomer (PET-30 available from Nippon Kayaku Co., Ltd.) and the sesamol-type benzotriazole monomer-reaction bonded acrylic polymer (1) (polymer in which a sesamol-type benzotriazole monomer at a mass ratio X of 20 parts by mass was reaction-bonded to MMA and a UV absorber) were mixed at a solid content mass ratio of 80:20.

Comparative Example 2

A sesamol-type benzotriazole monomer-reaction bonded acrylic polymer (4) was synthesized as in Example 1, except that the mass ratio X of the sesamol-type benzotriazole monomer was changed to 60 parts by mass.

An optical layered body was produced as in Example 1, except that the polyfunctional monomer (PET-30 available from Nippon Kayaku Co., Ltd.) and the sesamol-type benzotriazole monomer-reaction bonded acrylic polymer (4) (polymer in which a sesamol-type benzotriazole monomer at a mass ratio X of 60 parts by mass was reaction-bonded to MMA and a UV absorber) were mixed at a solid content mass ratio of 10:90.

Comparative Example 3

An optical layered body was produced as in Example 1, except that UVR5080 available from Shin-Nakamura Chemical Co., Ltd. was used alone instead of the polyfunctional monomer and the sesamol-type benzotriazole monomer-reaction bonded acrylic polymer (1).

Comparative Example 4

An optical layered body was produced as in Example 1, except that EXF-PU003 available from Dainichiseika Color & Chemicals Mfg. Co., Ltd. was used alone instead of the polyfunctional monomer and the sesamol-type benzotriazole monomer-reaction bonded acrylic polymer (1).

Comparative Example 5

A sesamol-type benzotriazole monomer-reaction bonded acrylic polymer (5) was synthesized as in Example 1, except that the mass ratio X of the sesamol-type benzotriazole monomer was changed to 70 parts by mass.

An optical layered body was produced as in Example 1, except that the polyfunctional monomer (PET-30 available from Nippon Kayaku Co., Ltd.) and the sesamol-type benzotriazole monomer-reaction bonded acrylic polymer (5) (polymer in which a sesamol-type benzotriazole monomer at a mass ratio X of 70 parts by mass was reaction-bonded to MMA and a UV absorber) were mixed at a solid content mass ratio of 10:90.

Comparative Example 6

A sesamol-type benzotriazole monomer-reaction bonded acrylic polymer (6) was synthesized as in Example 1, except that the mass ratio X of the sesamol-type benzotriazole monomer was changed to 5 parts by mass.

An optical layered body was produced as in Example 1, except that the polyfunctional monomer (PET-30 available from Nippon Kayaku Co., Ltd.) and the sesamol-type benzotriazole monomer-reaction bonded acrylic polymer (6) (polymer in which a sesamol-type benzotriazole monomer at a mass ratio X of 5 parts by mass was reaction-bonded to MMA and a UV absorber) were mixed at a solid content mass ratio of 10:90.

Comparative Example 7

An optical layered body was produced as in Example 1, except that "FDB-004" that is a specific wavelength absorbing dye available from Yamada Chemical Co., Ltd. was used instead of the sesamol-type benzotriazole monomer-reaction bonded acrylic polymer (1) and the solid content mass ratio PET-30:FDB-004 was set to 90:10.

Comparative Example 8

An attempt was made to produce an optical layered body as in Example 1, except that the polyfunctional monomer (PET-30 available from Nippon Kayaku Co., Ltd.) and "SPM-17" that is a UV absorbing dye available from Hayashibara Co. were mixed at a solid content mass ratio of 95:5. However, the UV absorbing dye was not dissolved and a functional layer could not be formed.

The optical layered bodies obtained in the examples and comparative examples were evaluated as follows. Table 1 shows the results.

(Spectral Transmittance)

Data on the transmittance at least five points in 1 nm ranges before and after a certain wavelength was obtained using a spectrophotometer (UVPC-2450 available from Shimadzu Corporation) with which the transmittance can be measured in units of 0.5%, and the obtained data was averaged. The spectral transmittance was measured at wavelengths of 380 nm, 410 nm, 420 nm, and 440 nm using the average data.

Figure 3:
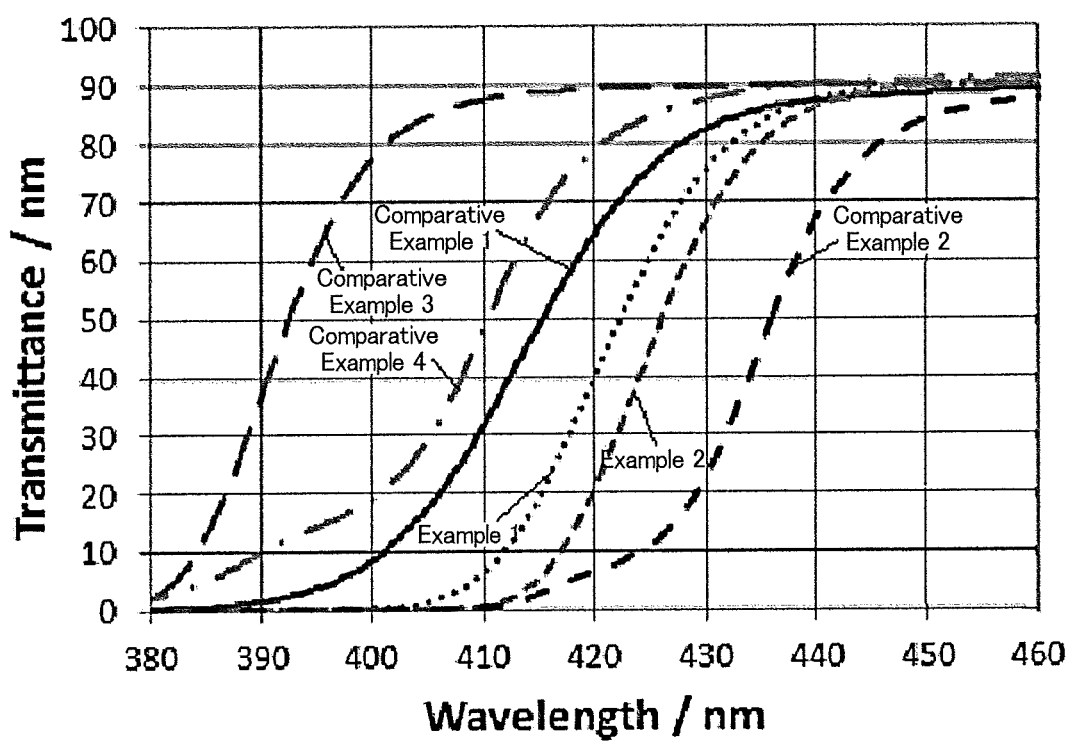
FIG. 3 is a graph showing the spectral transmittances of optical layered bodies of examples and comparative examples.

FIG. 3 shows a graph of the spectral transmittances according to Examples 1 and 2 and Comparative Examples 1 to 4.

(Blue Light Cutting (Blocking) Rate)

The blue light cutting rate was calculated in conformity with JIS T 7333-2005.

(Tilt a of Spectral Transmittance within a Wavelength Range of 415 to 435 nm)

The tilt a was calculated by measuring the transmittance at least five points in 1 nm ranges before and after a certain wavelength using a spectrophotometer (UVPC-2450 available from Shimadzu Corporation) with which the transmittance can be measured in units of 0.5%, averaging the obtained data, and calculating the average data of the transmittance within a wavelength range of 415 to 435 nm.

(Color Tone of Displayed Image)

The parameters a* and b* were measured using a spectrophotometer (UVPC-2450 available from Shimadzu Corporation) with which the measurement can be carried out in units of 0.5%.

(Comprehensive Evaluation)

Those having a blue light cutting rate of 40% or higher and not affecting the color tone was rated "Good" and those having a blue light cutting rate of lower than 40% and/or affecting the color tone was rated "Poor".

TABLE 1

| Sample | a* | b* | Spectral transmittance (%) | | | | Blue light cutting rate | a | Comprehensive evaluation |
| --- | --- | --- | --- | --- | --- | --- | --- | --- | --- |
| | | | 380 nm | 410 nm | 420 nm | 440 nm | | | |
| Example 1 | −2.97 | 5.46 | 0.0 | 6.1 | 39.6 | 87.6 | 41% | 3.4 | Good |
| Example 2 | −3.91 | 7.02 | 0.0 | 0.6 | 20.2 | 86.3 | 44% | 3.7 | Good |
| Example 3 | −4.87 | 8.74 | 0.0 | 0.1 | 9.9 | 84.2 | 46% | 4.1 | Good |
| Example 4 | −2.64 | 4.45 | 0.2 | 9.2 | 48.3 | 88.0 | 40% | 3.1 | Good |
| Example 5 | −5.65 | 13.21 | 0.0 | 0.5 | 10.5 | 71.5 | 50% | 2.2 | Good |
| Example 6 | −2.75 | 4.82 | 0.0 | 8.1 | 41.2 | 87.0 | 41% | 3.1 | Good |
| Example 7 | −2.54 | 4.32 | 0.0 | 9.2 | 43.1 | 88.1 | 41% | 3.2 | Good |
| Example 8 | −2.12 | 4.42 | 0.0 | 9.6 | 42.2 | 87.8 | 41% | 3.1 | Good |
| Example 9 | −2.51 | 5.21 | 0.0 | 9.5 | 41.1 | 88.0 | 41% | 3.2 | Good |
| Example 10 | −3.51 | 6.32 | 0.0 | 0.5 | 20.5 | 86.2 | 44% | 3.6 | Good |
| Example 11 | −2.62 | 4.68 | 0.0 | 9.5 | 43.0 | 87.8 | 41% | 3.1 | Good |
| Example 12 | −3.82 | 6.98 | 0.0 | 0.8 | 20.5 | 88.3 | 44% | 3.6 | Good |
| Example 13 | −4.02 | 7.22 | 0.0 | 0.4 | 19.8 | 86.2 | 45% | 3.8 | Good |
| Comparative Example 1 | −1.89 | 3.98 | 0.2 | 31.7 | 64.3 | 87.8 | 36% | 1.8 | Poor |
| Comparative Example 2 | −6.16 | 14.02 | 0.0 | 0.4 | 6.4 | 68.8 | 52% | 1.9 | Poor |
| Comparative Example 3 | −0.1 | 0.56 | 1.8 | 87.7 | 89.4 | 90.0 | 19% | 0.1 | Poor |
| Comparative Example 4 | −0.94 | 1.87 | 2.0 | 48.5 | 78.8 | 90.3 | 30% | 1.0 | Poor |
| Comparative Example 5 | −7.1 | 15.21 | 0.0 | 0.0 | 2.1 | 52.3 | 68% | 1.3 | Poor |
| Comparative Example 6 | −2.42 | 3.55 | 0.3 | 12.1 | 55.8 | 89.2 | 38% | 2.8 | Poor |
| Comparative Example 7 | −10.52 | 22.21 | 5.2 | 11.1 | 8.2 | 13.4 | 20% | −1.5 | Poor |
| Comparative Example 8 | — | — | — | — | — | — | — | — | Poor |

As shown in Table 1, all of the optical layered bodies according to the examples having a spectral transmittance at a wavelength of 380 nm to 440 nm within a specific range had a blue light cutting (blocking) rate of 40% or higher and did not affect the color tone of displayed images.

In contrast, the optical layered bodies according to Comparative Examples 1 and 6 had too high a spectral transmittance at a wavelength of 410 nm and the optical layered bodies according to Comparative Examples 3 and 4 had too high a spectral transmittance at a wavelength of 380 nm and a wavelength of 410 nm. In these cases, the blue light cutting (blocking) rate was poor.

The optical layered bodies according to Comparative Examples 2 and 5 had too low a spectral transmittance at a wavelength of 440 nm and too small a value of the tilt a, and failed to cut transmitted light at a wavelength of around 420 nm sharply.

The optical layered body according to Comparative Example 7 failed to satisfy the requirement of the spectral transmittance at all of the wavelengths of 380 nm, 410 nm, and 440 nm, being significantly poor in both the blue light cutting (blocking) rate and the color tone evaluation.

INDUSTRIAL APPLICABILITY

Having the structure described above, the optical layered body of the present invention can have excellent blue light blocking properties without affecting the color tone of displayed images, and can be suitably used for image display screens in image display devices such as liquid crystal displays (LCD), plasma displays (PDP), organic/inorganic electroluminescence displays (LED), and electronic paper and touch panels.

The invention claimed is:

1. An optical layered body having a structure comprising:
   a substrate; and
   one or more functional layers on at least one surface of the substrate in which a sesamol-type benzotriazole monomer is incorporated in at least one of the one or more functional layers,
   the optical layered body having a spectral transmittance at a wavelength of 380 nm of lower than 1%, a spectral transmittance at a wavelength of 410 nm of lower than 10%, and a spectral transmittance at a wavelength of 440 nm of 70% or higher.

2. The optical layered body according to claim 1,
   wherein a transmission spectrum within a wavelength range of 415 to 435 nm obtained by a least square method has a slope (a) satisfying a >2.0.

3. The optical layered body according to claim 1,
   wherein at least one of the functional layers has a spectral transmittance at a wavelength 380 nm of lower than 1%, a spectral transmittance at a wavelength of 410 nm of lower than 10%, and a spectral transmittance at a wavelength of 440 nm of 70% or higher.

4. The optical layered body according to claim 1,
   wherein the optical layered body has an arithmetic average roughness (Ra) of less than 10 nm on a surface opposite to a substrate side surface of the functional layer.

5. The optical layered body according to claim 1,
   wherein the optical layered body has projections and depressions on a surface opposite to a substrate side surface of the functional layer.

6. The optical layered body according to claim 1, further comprising multiple deposition layers on a surface opposite to a substrate side surface of the functional layer.

7. The optical layered body according to claim 1, further comprising an invisiblizing layer having a layered structure including multiple layers different in refractive index.

8. An image display device or touch panel sensor produced using the optical layered body according to claim 1.

9. The optical layered body according to claim 1, wherein the optical layered body has a blue light blocking rate of 40% or greater when calculated according to JIS T 7333-2005.

* * * * *